US012780093B2

(12) United States Patent
Greig et al.

(10) Patent No.: US 12,780,093 B2
(45) Date of Patent: Nov. 3, 2026

(54) SYSTEM FOR DETECTING OBSCURANTS ON A VEHICLE LAMP

(71) Applicant: Hella GmbH & Co. KGaA, Lippstadt (DE)

(72) Inventors: Nigel Greig, Auckland (NZ); Graeme Fuller, Auckland (NZ); Craig Beavis, Auckland (NZ); Arnold Christian, Auckland (NZ); Adam Valy, Auckland (NZ)

(73) Assignee: Hella GmbH & Co. KGaA, Lippstadt (DE)

( * ) Notice: Subject to any disclaimer, the term of this patent is extended or adjusted under 35 U.S.C. 154(b) by 160 days.

(21) Appl. No.: 18/341,351

(22) Filed: Jun. 26, 2023

(65) Prior Publication Data

US 2024/0001847 A1 Jan. 4, 2024

(30) Foreign Application Priority Data

Jun. 30, 2022 (AU) ................................ 2022901841

(51) Int. Cl.
*B60Q 11/00* (2006.01)
*B60Q 1/00* (2006.01)
(Continued)

(52) U.S. Cl.
CPC .......... *B60Q 11/005* (2013.01); *B60Q 1/0023* (2013.01); *B60S 1/56* (2013.01); *G01N 21/94* (2013.01); *H04N 5/33* (2013.01)

(58) Field of Classification Search
CPC ....... B60Q 11/005; B60Q 1/0023; B60S 1/56; G01N 21/94; H04N 5/33
See application file for complete search history.

(56) References Cited

U.S. PATENT DOCUMENTS 6,462,480 B1 10/2002 Tornare
7,969,566 B2 * 6/2011 Smith ................ G01N 21/8422 356/239.8

(Continued)

FOREIGN PATENT DOCUMENTS

AU 2002254895 B2 8/2006
AU 2020200985 A1 8/2020

(Continued)

OTHER PUBLICATIONS

DE102020115638 (Dec. 2021).*

*Primary Examiner* — Thomas D Alunkal
(74) *Attorney, Agent, or Firm* — Husch Blackwell LLP

(57) ABSTRACT

A system is provided for detecting obscurants on an outer surface of a lens of a vehicle lamp of a vehicle. The system includes a support, as well as an infrared (IR) light emitter-detector module coupled to the support. The IR light emitter-detector module includes an IR light emitter configured to emit IR light towards an inner surface of the lens, as well as an IR light detector configured to measure an intensity of IR light reflected by the obscurants. A controller is also coupled to the IR light emitter-detector module. The controller is configured to control the IR light emitter-detector module, determine a level of light obstruction based on the measured intensity of reflected IR light, and when the level of light obstruction meets predefined criteria, issue a warning.

18 Claims, 6 Drawing Sheets

(51) Int. Cl.
*B60S 1/56* (2006.01)
*G01N 21/94* (2006.01)
*H04N 5/33* (2023.01)

(56) References Cited

U.S. PATENT DOCUMENTS

| | | | | |
|---|---|---|---|---|
| 2011/0054794 | A1* | 3/2011 | Teder | G01N 21/552<br>702/3 |
| 2016/0033104 | A1* | 2/2016 | Larsen | F21S 41/255<br>362/520 |
| 2016/0272165 | A1* | 9/2016 | Hsiao | G02B 27/0006 |
| 2019/0384054 | A1* | 12/2019 | Mukojima | F21S 41/13 |
| 2020/0333182 | A1* | 10/2020 | Ahmed | G01J 1/4257 |

FOREIGN PATENT DOCUMENTS

| | | | |
|---|---|---|---|
| DE | 19618010 | C1 | 7/1997 |
| EP | 906851 | A1 | 4/1999 |

* cited by examiner

SYSTEM FOR DETECTING OBSCURANTS ON A VEHICLE LAMP

CROSS REFERENCE

This application claims priority to Provisional Australian Application No. 2022901841, filed 30 Jun. 2022, the entirety of which is hereby incorporated by reference.

FIELD OF THE INVENTION

This disclosure is directed to a system for detecting obscurants on a vehicle lamp.

BACKGROUND OF THE INVENTION

Commercial vehicles, such as concrete trucks, tipper/dumping trucks, materials handling vehicles, and other related vehicles, often work in dirty environments such as mines and quarries with muddy, unpaved roads. The result of working in such environments is that vehicle lamps, such as headlamps or headlights, rear lamps, brake lamps or brake lights, turn signal lamps, or other direction indicating or signalling lamps, etc., very often become dirty. This is especially the case given that the legally mandated location where lamps of a vehicle must be placed does not coincide with a location that would be optimal for clearance from obscurants such as dirt and debris. Such build-up of obscurants on vehicle lamps is well documented to degrade light output; with enough obscurant build-up, output of light from vehicle lamps may be reduced below legal and safe levels. Similar problems exist for marine vessels as well, which may encounter a build-up of obscurants in the form of salt on lamps above the waterline and algae on lamps below the waterline.

Thus, it would be desirable for an operator of such a commercial vehicle or marine vessel to be alerted before their vehicle lamps become so obscured by obscurants that the vehicle lamps become unsafe, illegal, or otherwise unusable.

SUMMARY OF THE INVENTION

An aspect of the invention provides a system for detecting obscurants on an outer surface of a lens of a vehicle lamp of a vehicle, comprising: a support; an infrared (IR) light emitter-detector module coupled to the support, the IR light emitter-detector module comprising: an IR light emitter configured to emit IR light towards an inner surface of the lens; and an IR light detector configured to measure an intensity of IR light reflected by the obscurants; and a controller coupled to the IR light emitter-detector module, the controller configured to: control the IR light emitter-detector module; determine a level of light obstruction based on the measured intensity of reflected IR light; and when the level of light obstruction meets predefined criteria, issue a warning.

An embodiment of the system further comprises a total internal reflection (TIR) module coupled to the support, the TIR module comprising: a visible light emitter configured to emit visible light through an interior of the lens at a first end of the lens; and a visible light detector configured to measure the visible light emitted through the interior of the lens at a second end of the lens; wherein the controller is configured to determine the level of light obstruction based further on the visible light measured at the second end of the.

BRIEF DESCRIPTION OF THE DRAWINGS

Notwithstanding any other embodiments which may fall within the scope of the claims, specific embodiments will now be described, by way of example, with reference to the accompanying drawings in which:

DETAILED DESCRIPTION OF THE DRAWINGS

Embodiments disclosed provide a system that alerts a vehicle operator before obscurants on their vehicle's lamps reaches an unsafe, illegal, or otherwise unusable level.

Figure 1A:
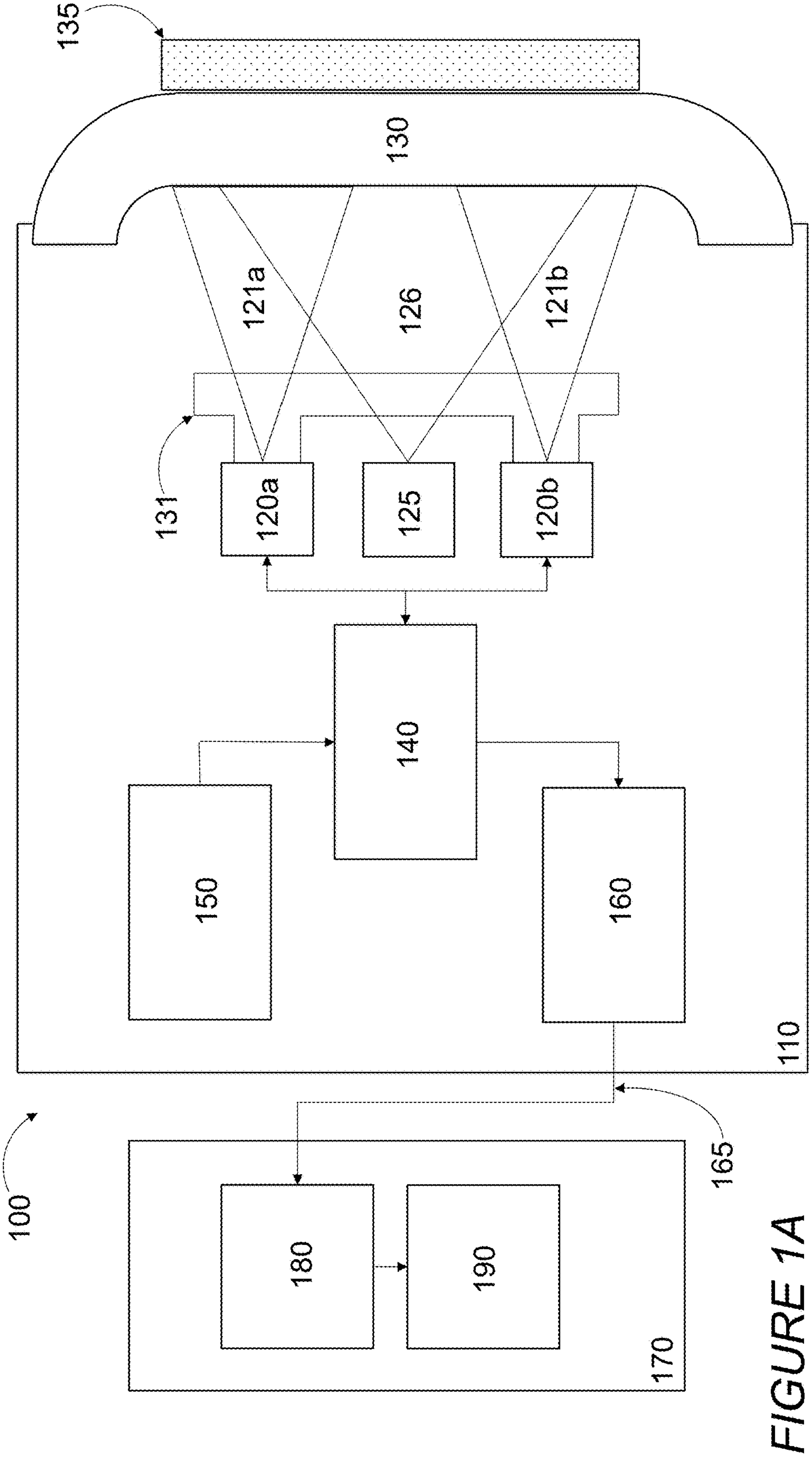
FIG. 1A depicts an embodiment of a system for detecting obscurants on a vehicle lamp.

FIG. 1A depicts an embodiment of a system 100 for detecting obscurants 135. Broadly, system 100 comprises a vehicle lamp 110, e.g., a headlamp or rear lamp, and vehicle cab electronics 170.

The vehicle lamp 110 comprises a lens 130, light emitter/detector pairs or modules ("LEDP") 120*a*, 120*b*, etc. (individually and collectively referred to as LEDPs 120), a main light emitter 125, a controller 140, a failure detection management subsystem 150, and a pulse generator 160, e.g., a Hella™ Compatibility Solution ("HCS") pulse generator. When in use, the obscurants 135 are on the exterior of the lens 130 of the vehicle lamp 110 and are detected by the system and its embodiments discussed below.

In FIG. 1A, the vehicle lamp 110 is depicted with two LEDPs 120*a*, 120*b* for illustrative purposes only; the vehicle lamp 110 may have any number of LEDPs greater than or equal to one. Each LEDP 120 comprises a light emitter, e.g., a light-emitting diode ("LED"), and a light detector or sensor, e.g., a photodiode. Each light emitter may be configured to emit light comprising visible light or light in the infrared ("IR") region of the electromagnetic ("EM") spectrum. Each light detector may be configured to detect light comprising visible light or IR light. Each LEDP 120 comprises a light emitter and a light detector pair configured to emit or detect the same frequency range of light, e.g., a LEDP 120 comprising a visible light emitter and a visible light detector or a LEDP 120 comprising an IR light emitter and an IR light detector. In some embodiments, each LEDP 120 may comprise both a visible light emitter and visible light detector pair and an IR light emitter and IR light detector pair. In some embodiments, each LEDP 120 may comprise different numbers of light emitters and light detectors, e.g., two light emitters and a single light detector or a single light emitter and two light detectors.

Each LEDP 120 emits a light path 121 that is guided and defined by an internal lens 131 or internal optic. The internal lens 131 guides the IR light from any IR emitter of IR LEDPs 120 to provide light paths 121 in different directions compared with the main light path 126 from the main light emitter 125 in order to minimise excessive back scatter or reflectance of light. In some embodiments, light paths 121 bypass the internal lens 131 via light pipes (not shown).

The main light emitter 125 comprises at least one visible light emitter and serves to provide a primary source of light for the vehicle lamp 110 through the lens 130 so that a vehicle operator may see their surroundings. The main light emitter 125 produces a main light path 126, also defined by the internal lens 131, that passes through the lens 130 to outside of the vehicle lamp 110, where the light output pattern of the vehicle lamp 110 from the main light emitter 125 and main light path 126 is defined by function or relevant legal standards. For example, a given main light emitter 125 may produce an amber coloured main light path 126 in a direction indicator or turn signal vehicle lamp 110, a red coloured main light path 126 in a stop indicator vehicle lamp 110, or a yellow or white coloured main light path 126 in a headlamp or rear lamp vehicle lamp 110. In some embodiments, if the light emitters of each LEDP 120 are powerful enough to produce a vehicle lamp 110 function light pattern (e.g., a turn signal or a stop signal), the main light emitter 125 may be omitted from the vehicle lamp 110. In some embodiments, the main light emitter 125 may provide the function that the visible light emitters of LEDPs 120 provide; in these embodiments, a LEDP 120 may comprise, e.g., an IR light emitter, an IR light detector, and a visible light detector.

When there are no obscurants 135 present on the lens 130, the optical properties of the vehicle lamp 110 are characterised by low internal optical reflectance, i.e., the main light path 126 produced by the main light emitter 125 passes through the lens 130 without much light being reflected back inside the vehicle lamp 110. The build-up of obscurants 135, however, may degrade or otherwise reduce the light output of the main light path 126 below legal and safe levels.

Common obscurants 135 that are present on commercial vehicles working in mines and quarries are soil, sand, and coal. Each of these obscurants 135 have different optical properties and require a varied approach in order to be detected on the lens 130 of a vehicle lamp 110. When grouped and ordered by optical properties, at one end of the different types of obscurants 135 are a first type of obscurant 135, which include white sand. This first type of obscurant 135 has optical properties that are relatively high in reflectance across the light spectrum of the EM spectrum, i.e., the ultraviolet ("UV"), visible light, and IR parts of the EM spectrum, and may have a significant degree of wavelength dependence. At the other end of the different types of obscurants 135 is a second type of obscurant 135, which include coal, coal dust, or black sand. This second type of obscurant 135 has optical properties that are relatively low in transmittance (or high optical transmission loss) and reflectance across the light spectrum. Other obscurants 135, such as soil, dirt, or other compositions of materials, will generally fall in between the transmittance and reflectance optical properties of the first and second types of obscurants 135. By knowing these optical properties, obscurants 135 can be detected on the lens 130.

For example, soil typically has a relatively high reflectance coefficient in the IR region of the EM spectrum and a relatively low reflectance coefficient in the visible region of the EM spectrum. White sand, however, has a relatively high reflectance coefficient in both the IR and visible region of the EM spectrum. Thus, by measuring the reflectance caused by the first type of obscurants 135 in both the visible and IR regions of the EM spectrum, the first type of obscurants 135 can be detected on the lens 130 and potentially be distinguished from one another or from the second type of obscurants 135.

Broadly and with reference to FIG. 1A, in order to detect the effect of the first type of obscurants 135 blocking the main light path 126 from exiting the vehicle lamp 110, the reflectance of the light produced by the light emitters of the LEDPs 120, represented by the measurement coverage area provided by LEDP light paths 121*a*, 121*b*, back from the first type of obscurants 135 is measured by the light detectors of the LEDPs 120 from within the vehicle lamp 110.

Specifically, in order for the system 100 to measure the effects of build-up of the first type of obscurants 135 has on visibility through the lens 130, a combination of visible light and IR LEDPs 120 are used. Visible light and IR light are first emitted by respective light emitters of LEDPs 120. The type or colour of light emitted by the light emitters of LEDPs 120 may coincide with the function of the vehicle lamp 110, e.g., an amber light for direction indicator vehicle lamps 110 or red light for stop indicator vehicle lamps 110, in order to not disturb or detract from the function of the vehicle lamp 110 and to maximise light transmission through the lens 130 while minimising light back scatter from the lens 130. That is, the colour of the lens 130 may be chosen to be similar to the main light colour to minimise excessive background reflectance from the main light emitter 125. Then, the visible and IR light detectors of LEDPs 120 detect the visible light and IR light reflectance to obtain measurements indicative of the effect of the first type of obscurants 135 on visibility through the lens 130. For example, the IR light detectors of LEPDs 120 might measure a 15% reflectance of IR light and the visible light detectors of LEDPs 120 might measure an 8% reflectance of visible light. These measurements may be the product of looking at measurements of signals taken across multiple light detectors over a period of time, where rejection sampling techniques may be used and fuzzy logic may be applied. The controller 140 then compares these measurements to a threshold value or predefined criteria to see if a fault or warning message of obscurants 135 being present on the lens 130 should be issued, which is discussed further below.

The same method of detecting the first type of obscurants 135 cannot be used to detect the second type of obscurants 135 due to the low reflectance and low optical transmission properties of the second type of obscurants 135. In order to detect the second type of obscurants 135, an embodiment of the system 100 as depicted in FIGS. 1B and 2A-2C is used.

Figure 1B:
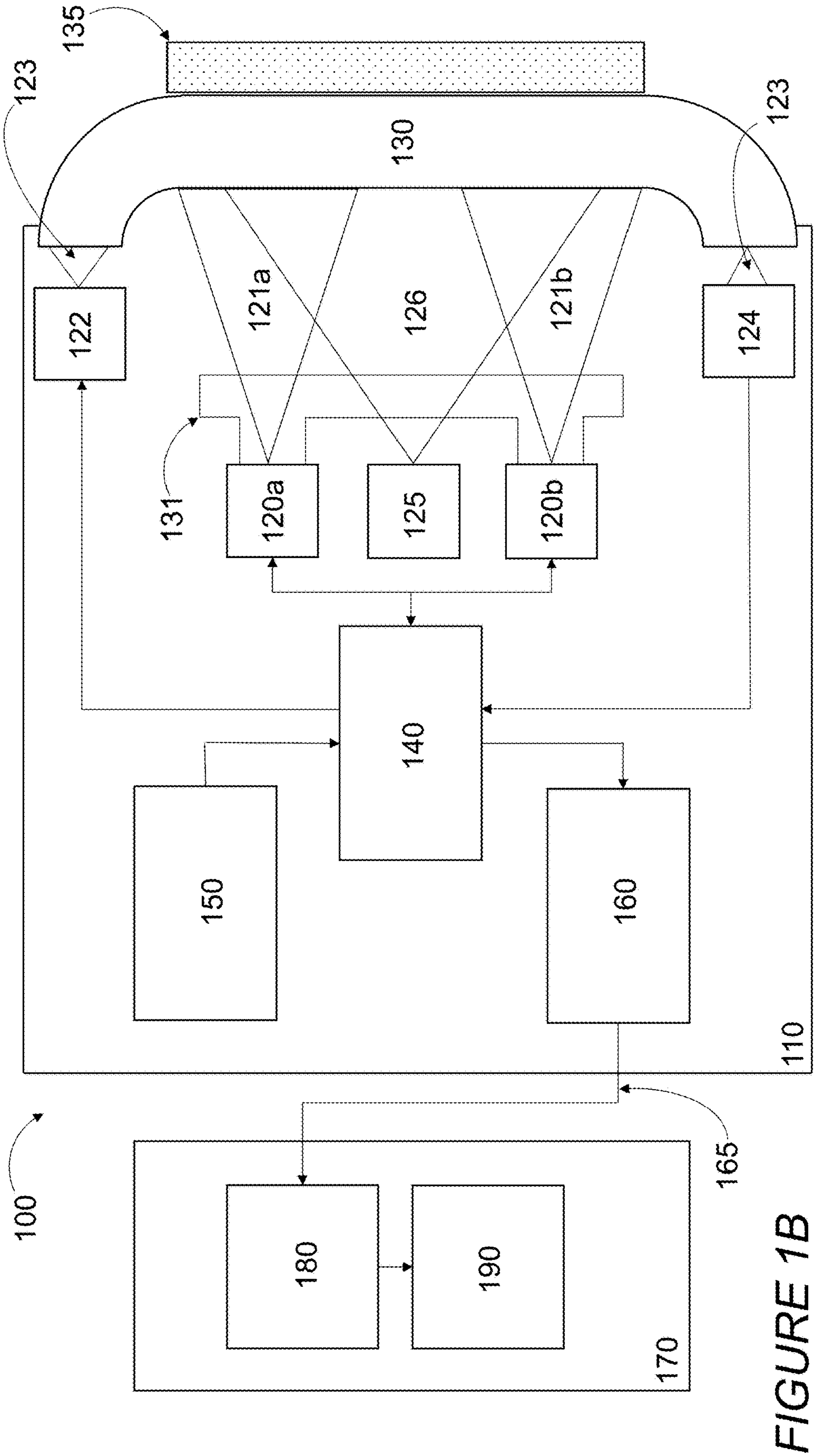
FIG. 1B depicts another embodiment of a system for detecting obscurants on a vehicle lamp.

In the embodiment depicted in FIG. 1B, a light emitter 122 emits a light path 123 through the lens 130, which acts as a light pipe, where a light detector 124 measures the level of light of light path 123 passing through the lens 130. Like the LEDPs 120, the vehicle lamp 110 is depicted with one light emitter 122 for illustrative purposes only; the vehicle lamp 110 may have any number of light emitters 122 greater than or equal to one.

Figure 2A:
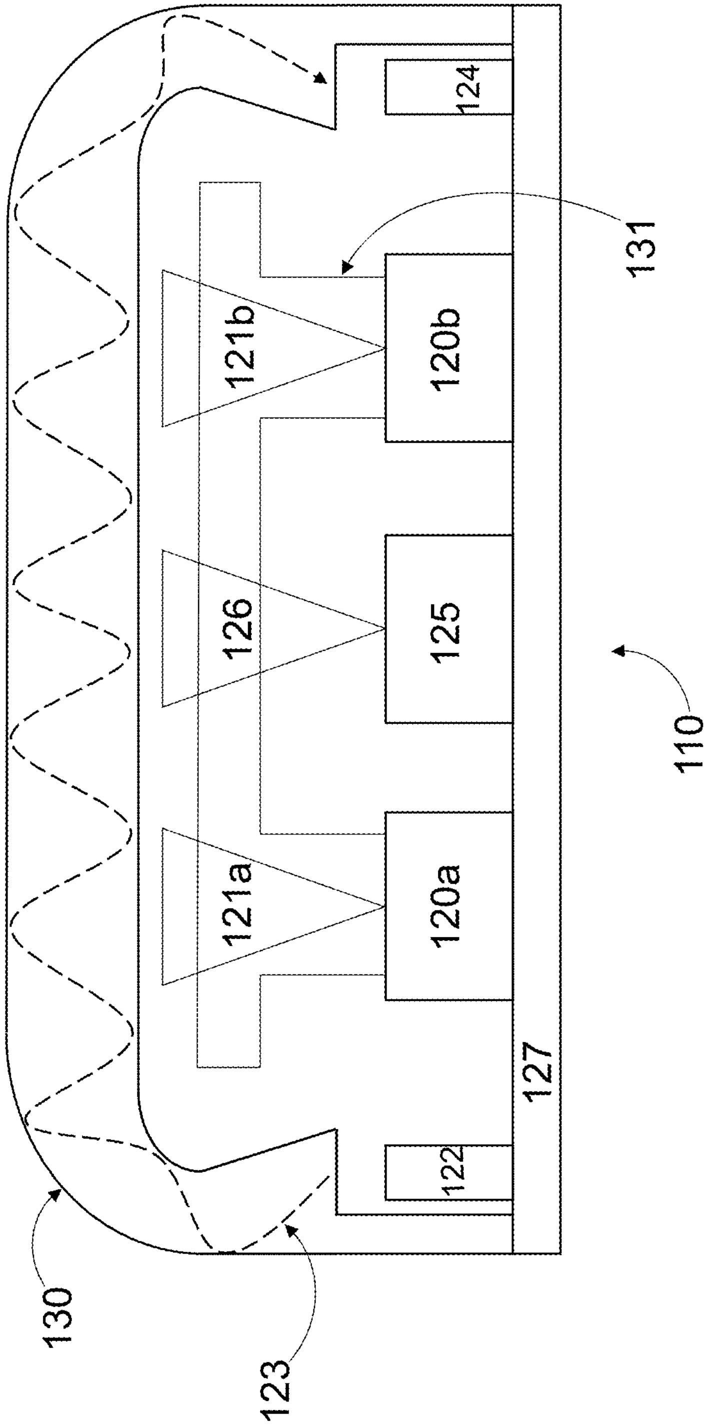
FIG. 2A depicts an alternative view of an embodiment of a vehicle lamp.

In FIG. 2A, which presents an alternative view of the embodiment depicted in FIG. 1B but without the presence of any obscurants 135, a clean lens 130 is depicted on a vehicle lamp 110, where the LEDPs 120*a*, 120*b*, main light emitter 125, the light emitter 122, and the light detector 124 are mounted on a support 127. In some embodiments, the support 127 is a printed circuit board. With a clean lens 130, the light path 123 emitted by the light emitter 122 will travel efficiently from one end of the lens 130 through the internal length of the lens 130 via total internal reflection ("TIR") and be detected at the other end of lens 130 by light detector 124.

Figure 2B:
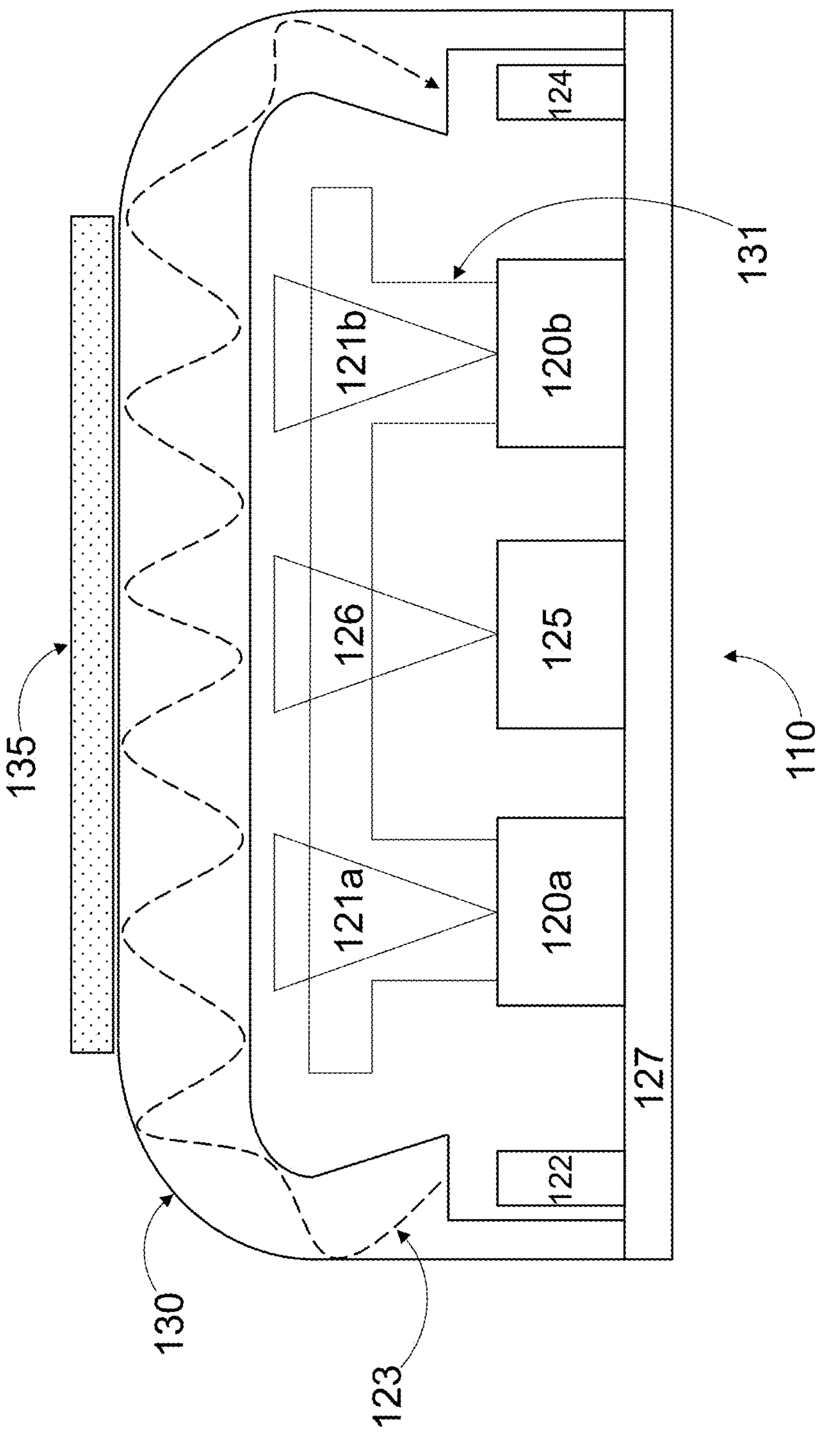
FIG. 2B depicts an alternative view of an embodiment of a vehicle lamp with the presence of an obscurant.

In FIG. 2B, which presents an alternative view of the embodiment depicted in FIG. 1B, a first type of obscurant 135 has obscured the lens 130. Due to the optical properties of the first type of obscurant 135, the light path 123 emitted by the light emitter 122 is still able to travel the length of the lens 130 via TIR and be measured by the light detector 124 despite the build-up of the first type of obscurant 135 on the lens 130. More specifically, both the first and second type of obscurants 135, which typically have a similar refractive index when compared to the material of the lens 130, e.g., polycarbonate, disrupt the light-piping action, or TIR, by removing the lens 130 to air refractive index boundary, resulting in some of the light from the light emitter 122 entering the obscurant 135. However, because the first type of obscurants 135 are relatively reflective, a relatively high proportion of the light path 123 emitted by the light emitter 122 will be returned to the light pipe inside the lens 130.

Figure 2C:
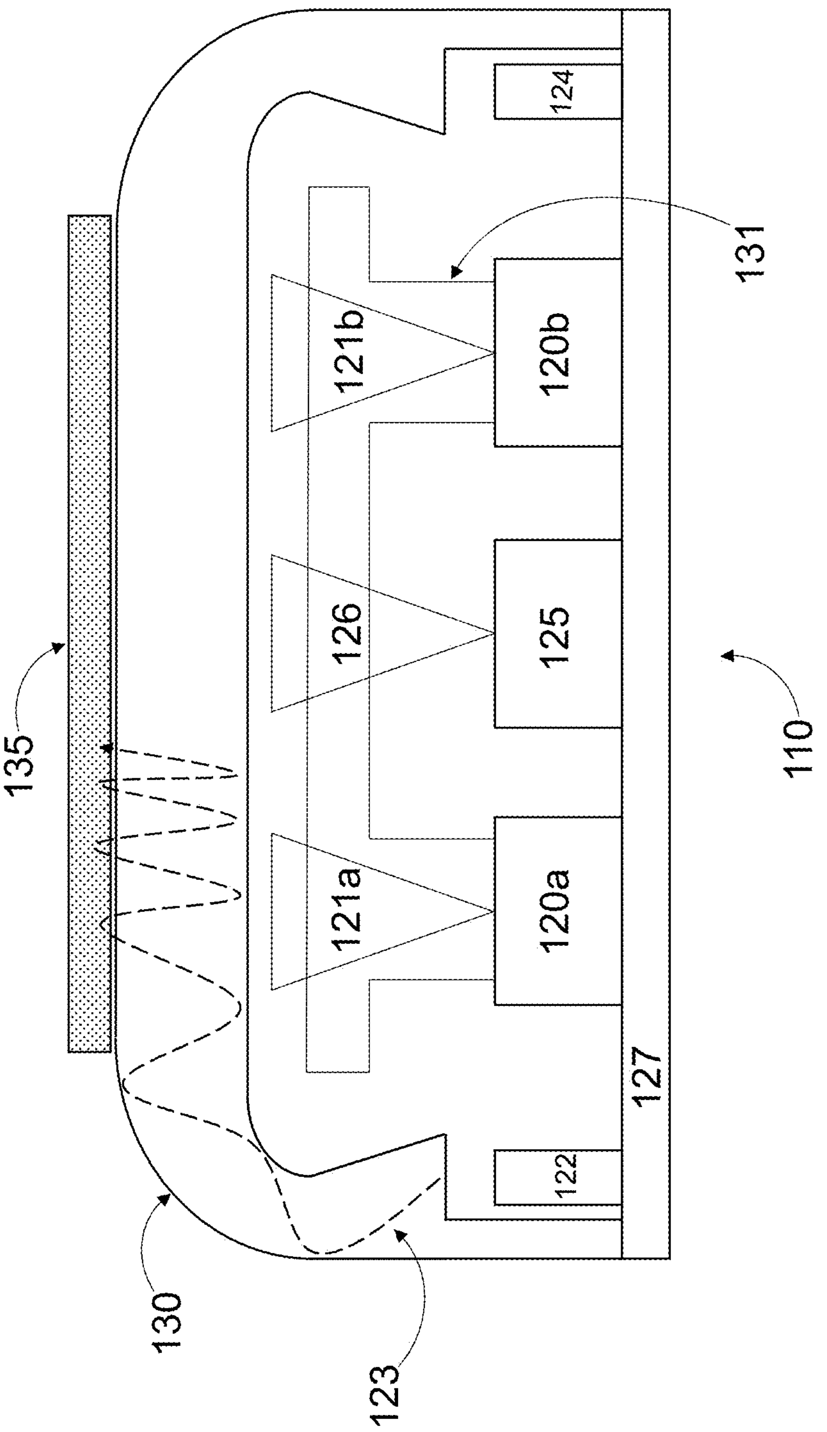
FIG. 2C depicts an alternative view of an embodiment of a vehicle lamp with the presence of a different type of obscurant.

In FIG. 2C, which presents an alternative view of the embodiment depicted in FIG. 1B, a second type of obscurant 135 has obscured the lens 130. Unlike what is described with respect to FIGS. 2A-2B, due to the optical properties of the second type of obscurant 135, the light path 123 emitted by the light emitter 122 is unable to travel the length of the lens 130 via TIR and will not be detected by the light detector 124. The build-up of a second type of obscurant 135, which has a relatively low reflectance and low transmissibility (or high optical transmission loss), will disrupt the TIR that creates the light pipe action within the lens 130. More specifically, there will be no TIR at the interface between an outer optic of the lens 130 and the second type of obscurant 135 and the light path 123 generated by the light emitter 122 will travel into the second type of obscurant 135, be absorbed, and not detected by light detector 124.

In order for the system 100 to measure how much the second type of obscurant 135 have built-up on the lens 130, a visible light emitter 122 and a visible light detector 124 may be used. The colour of the light path 123 emitted by the light emitter 122 may preferably match the colour of the lens 130, e.g., a light emitter 122 that emits amber light with an amber coloured lens 130 used in a direction indicator, so as to minimise any background attenuation that may disrupt the detecting or sensing performed by the light detector 124. Alternatively, an IR light emitter 122 and an IR light detector 124 may be used instead of a visible light emitter 122 and a visible light detector 124, provided that the material of the lens 130 is relatively transparent in the IR part of the EM spectrum and that the dyes used to colour the lens 130 are carefully selected.

For both the first and second types of obscurants 135, there is a relationship between the degree of how much the obscurants 135 cover the lens 130 and the total amount of light reflected back from the obscurants 135. There is also a relationship between the thickness and opacity of the obscurants 135 and the total amount of light reflected back from the obscurants 135, as a thin layer of obscurant with higher opacity 135 will have less reflectance and more transmission relative to a thick layer of obscurant 135. Embodiments disclosed herein take these relationships into account when detecting the obscurants 135.

The combination of the colour of visible light used in LEDPs 120, the colour of visible light used by the visible light emitter 122, and the colour of the lens 130 may vary and that any suitable combination may be used.

Advantageously, with respect to the process of detecting the build-up of obscurants 135, the process of emitting and detecting light can be accomplished in the order of tens of microseconds and can be accomplished while the vehicle lamps 110 are on and operating. With the detection process being performed at such speeds, any light emitted during the process will barely be detectable, and even then, such emitted light is visually overshadowed by the main light emitters 125 and their function. Alternatively, the detection process can be completed within 20 ms when the vehicle lamp 110 powers on to avoiding any disruption of the primary lamp function or in an interleaved process during operation of the lamp in a series of short time intervals.

Figure 3:
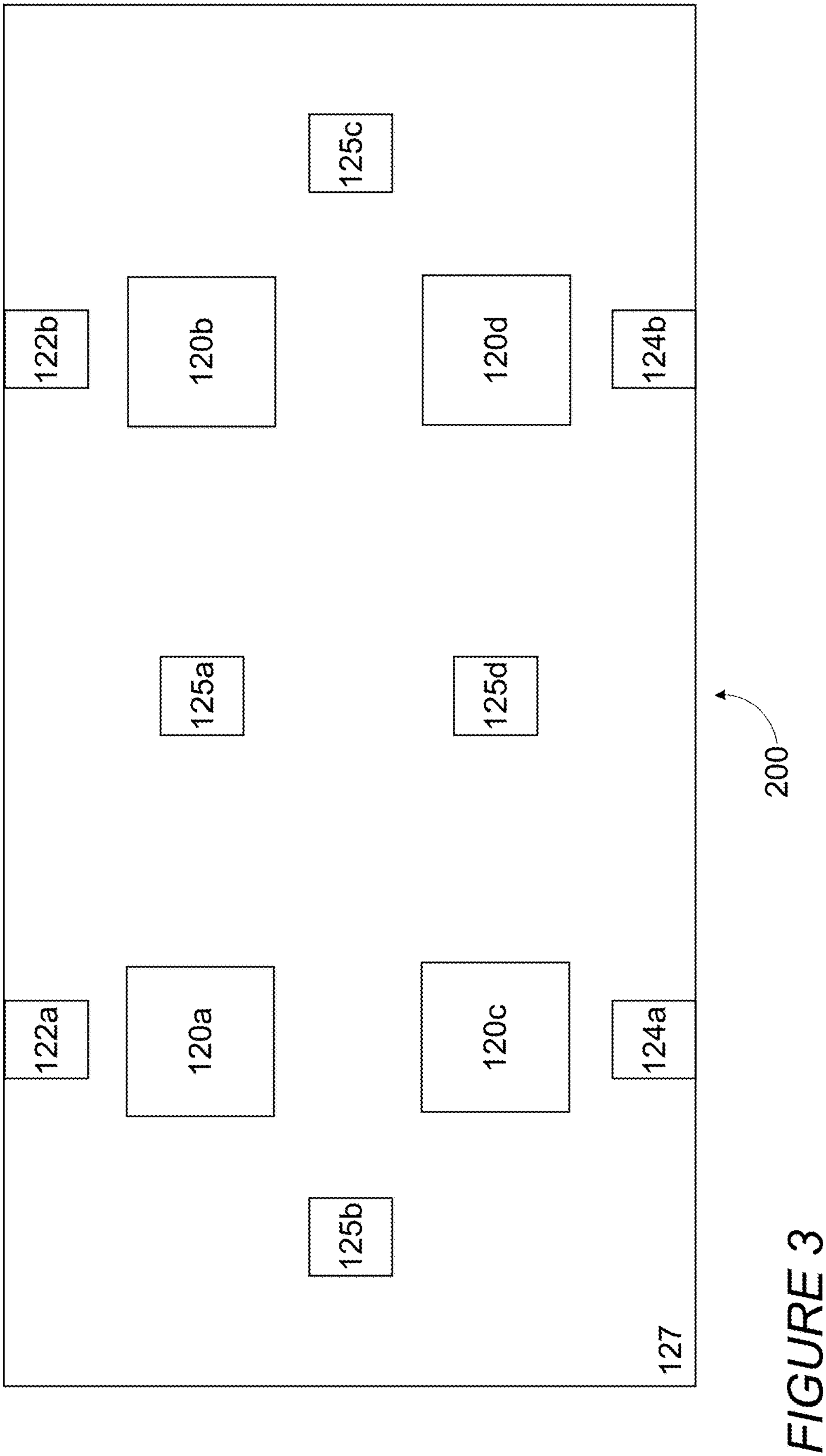
FIG. 3 depicts an example layout of vehicle lamp components on a support.

An embodiment 200 of the support 127 layout is depicted in FIG. 3, where four main light emitters 125*a*, 125*b*, 125*c*, 125*d*, four LEDPs 120*a*, 120*b*, 120*c*, 120*d* each comprising both a visible light emitter and visible light detector pair and an IR light emitter and IR light detector pair, two light emitters 122*a*, 122*b*, and two light detectors 124*a*, 124*b* are mounted on a support 127. As shown in FIG. 3, LEDPs 120*a*, 120*b*, 120*c*, 120*d* are located towards the corners of the support 127 and around the edges of the lens 130 (not pictured) in order to provide a representative set of measurements across the entirety of the lens 130, e.g., a collection of measurements at specific points across the lens 130. The light emitted by the main light emitters 125*a*, 125*b*, 125*c*, 125*d*, are placed to provide the vehicle lamp 110 function light pattern. More or fewer LEDPs 120 may be utilised where the distance between the LEDPs 120 and the lens 130 varies and thus requiring varied measurement locations, or where the lens 130 is larger or smaller relative to the measurement coverage area provided by the LEDP light paths 121 (not pictured, but FIGS. 1A and 1B may be referred to), or where the size of the lens 130 or the materials the lens 130 is made from requires more light transmission and sensitivity to achieve a suitable measurement.

In an embodiment, all light detectors of the LEDPs are coupled to individual op amps as transimpedance amplifiers. For example, quad-op amp packages such as MCP6024 may be utilised.

It is possible to use a single IR LEDP 120 to detect built up obscurants 135 on the lens 130. However, using a single IR LEDP 120 limits the vehicle lamp 110 size and shape due to the need to provide an appropriate viewing or light output area in the form of a LEDP light path 121. Additionally, where vehicle lamp 110 light output regulations require light to be unevenly distributed from a lens 130, a single detector of a LEDP 120 may be unable to measure variations in light reflectance values across the lens 130 to ensure that minimum levels are met at different locations or angles of the vehicle lamp 110. Utilising a plurality of visible light and IR light LEDPs 120 to measure obscurants 135 across the lens 130, as discussed with respect to FIG. 1A, ensures that minimum light outputs are met at different locations and at different viewing angles for lamps of any size or shape.

Referring back to FIGS. 1A-1B, the rest of the components of the system 100 will be discussed. The system 100 comprises a vehicle lamp 110 and vehicle cab electronics 170, where the vehicle lamp 110 comprises a controller 140, a failure detection management subsystem 150, and a pulse generator 160 and the vehicle cab electronics 170 comprises a vehicle body control unit ("BCU") 180 and a vehicle fault indicator 190.

Within the vehicle lamp 110, the failure detection management subsystem 150 is coupled to and communicates with the controller 140. The controller 140 is coupled to and communicates bidirectionally with the LEDPs 120, is coupled to and receives information from the light detector 124, and is coupled to and communicates with the pulse generator 160. The pulse generator 160 is coupled to and communicates with the vehicle BCU 180 of the vehicle cab electronics 170, e.g., via a vehicle cable harness 165. The vehicle BCU 180 is coupled to and communicates with the vehicle fault indicator 190. Advantageously, the invention utilises existing vehicle electrical infrastructure such as the vehicle BCU 180 and vehicle cable harness 165 between the rear of a vehicle and the front cab of the vehicle, thus replacement of vehicle electrical components is not required for the invention.

The failure detection management subsystem 150 oversees the operational status of the vehicle lamp 110. In existing implementations, when a failure occurs, such as a light emitter (e.g., LED) short circuit or open circuit (known as a N-1 fault) or other component or subsystem failure, the failure detection management subsystem 150 provides this information to the controller 140.

The controller 140, e.g., a microcontroller, provides control of the LEDPs 120, e.g., controlling when the light emitters of the LEDPs 120 emit light and when the light detectors of the LEDPs 120 take measurements as well as receiving the measurements taken by the light detectors of the LEDPs 120, controls the light emitter 122 and receives measurements from the light detector 124, and communicates with the pulse generator 160. The controller 140 also implements application logic, such as the post processing of measurements taken by the light detectors of the LEDPs 120 and light detector 124, discussed above, and implementing criteria of when to send an alert regarding an unsafe obscured lens 130 to the vehicle operator.

In an embodiment, the controller 140 provides DSP functionality, and ambient and main light rejection using synchronous modulation/demodulation, e.g., at about 2 kHz, although a wide range of frequencies may be used.

In an embodiment, transimpedance outputs are coupled to an analog to digital converter of the controller 140 via a multiplexer and further signal conditioning, e.g., bandpass filtering.

In an embodiment, the controller 140 comprises memory that stores measurements taken by the light detectors of LEDPs 120 and light detector 124. By storing measurements taken by the light detectors of LEDPs 120 and light detector 124, a record of cleanliness of a vehicle lamp 110 may be maintained.

The pulse generator 160 generates a pulse sequence defined by ISO standard 13207-1, such as a HCS pulse sequence. The pulse sequence is monitored on the vehicle lamp 110 powerlines or vehicle cable harness 165 by the vehicle BCU 180. When there is a fault in the vehicle lamp 110 communicated by the controller 140, the pulse sequence is suppressed or otherwise changed, which indicates a vehicle lamp 110 fault to the vehicle BCU 180 to warn the vehicle operator of the fault, e.g., a signal light fault. A general discussion of pulse sequences, such as HCS pulse sequence, are is available in Australian Patent No. 2002254895B2, which is incorporated herein by reference in its entirety.

The vehicle BCU 180 is an electronic control unit responsible for monitoring and controlling various electronic accessories in a vehicle's body, e.g., controller the power windows, power mirrors, air conditioning, immobiliser system, central locking. The vehicle BCU 180 also monitors the status of the vehicle lamps 110, and in the event of a vehicle lamp 110 failure such as a N-1 fault detected by the failure detection management subsystem 150 or a light obstruction measurement received by the controller 140 exceeds a threshold level or meets predefined criteria, i.e., in the event that the obscurants 135 on the lens 130 reach an unsafe or illegal level, the vehicle BCU 180 will communicate this information to the vehicle fault indicator 190.

The vehicle fault indicator 190 receives information from the vehicle BCU 180 and alerts the vehicle operator of vehicle faults. When the faults concern the vehicle lamps 110, a signal lamp on, e.g., a dashboard of the vehicle, is indicated or turned on; alternatively, the indicator lamp function may be run at double the normal frequency, e.g., the audio noise of a turn signal triggers at twice its normal rate.

In an embodiment, the system 100 may include an obscurant detection response system 195 (not pictured) that is coupled to the pulse generator 160 and the vehicle cab electronics 170 and is external to the vehicle lamp 110 and the vehicle cab electronics 170. The obscurant detection response system 195 may be located near the lens 130 of a vehicle lamp 110. When the controller 140 determines a light obstruction measurement from the light detectors of the LEDPs 120 exceeds a threshold level or meets predefined criteria and communicates this information to the pulse generator 160, the pulse generator 160 communicates this information to the obscurant detection response system 195 to then provide an additional warning indication to the vehicle BCU 180 and/or activate an obscurant counter measure such as using a jet of water to clean the lens 130, using a wiper blade to clean the lens 130, or some other mechanical method of cleaning the lens 130.

In an embodiment, the vehicle lamp 110 includes a communication port 155 (not pictured) which is coupled to the controller 140 and pulse generator 160 within the vehicle lamp 110 and coupled to the vehicle BCU 180 and the obscurant detection response system 195. The communication port 155 allows for an alternative path of information to flow within the system 100 and may support any suitable industry communication or connection standard, e.g., RS-232 or USB.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

LIST OF ELEMENTS

100 System for detecting obscurants
110 Vehicle lamp
120*a*, 120*b* Light emitter/detector pair
121*a*, 121*b* Light path of light emitter/detector pair 120*a*, 120*b*
122 Light emitter
123 Light path of light emitter 122
124 Light detector
125 Main light emitter
126 Main light path
127 Support
130 Lens
131 Internal lens
135 Obscurant
140 Controller
150 Failure detection management subsystem
155 Communication port
160 Pulse generator
165 Vehicle cable harness
170 Vehicle cab electronics

180 Vehicle body control unit
190 Vehicle fault indicator
195 Obscurant Detection Response System
200 An embodiment of a support 170 layout

The invention claimed is:

1. A system for detecting obscurants on an outer surface of a lens of a vehicle lamp of a vehicle, the system comprising:
- a support;
- an infrared (IR) light emitter-detector module coupled to the support, the IR light emitter-detector module including:
  - an IR light emitter configured to emit IR light towards an inner surface of the lens; and
  - an IR light detector configured to measure an intensity of IR light reflected by the obscurants;
- a controller coupled to the IR light emitter-detector module, the controller configured to:
  - control the IR light emitter-detector module;
  - determine a level of light obstruction based on the measured intensity of reflected IR light; and
  - when the level of light obstruction meets predefined criteria, issue a warning; and
- a total internal reflection (TIR) module coupled to the support, the TIR module including:
  - a visible light emitter configured to emit visible light through an interior of the lens at a first end of the lens, and
  - a visible light detector configured to measure the visible light emitted through the interior of the lens at a second end of the lens,
- wherein the controller is configured to determine the level of light obstruction based further on the visible light measured at the second end of the lens.

2. The system of claim 1, further comprising:
- a visible light emitter-detector module coupled to the support, the visible light emitter-detector module comprising:
- a second visible light emitter configured to emit visible light towards an inner surface of the lens; and
- a second visible light detector configured to measure an intensity of visible light reflected by the obscurants;
- wherein the controller is coupled to the visible light emitter-detector module and is configured to:
  - control the visible light emitter-detector module; and
  - determine the level of light obstruction based on the measured intensity of reflected visible light and the measured intensity of reflected IR light.

3. The system of claim 2, wherein the obscurants are identifiable based on the measured intensity of reflected visible light, the measured intensity of reflected IR, and the visible light measured at the second end of the lens.

4. The system of claim 1, further comprising:
- a subsystem coupled with the controller, the subsystem configured to communicate fault information to the controller.

5. The system of claim 4, wherein the fault information comprises at least one of a short circuit information, an open circuit information, a vehicle component information.

6. The system of claim 1, wherein the controller is further configured to provide DSP functionality.

7. The system of claim 1, wherein the controller is further configured to provide ambient and main light rejection using synchronous modulation/demodulation.

8. The system of claim 1, wherein the controller comprises an analog to digital converter and transimpedance outputs are coupled to the analog to digital converter via a multiplexer.

9. The system of claim 1, wherein the controller comprises memory for storing the measured intensity of reflected IR light.

10. A system for detecting obscurants on an outer surface of a lens of a vehicle lamp of a vehicle, the system comprising:
- a support;
- an infrared (IR) light emitter-detector module coupled to the support, the IR light emitter-detector module including:
  - an IR light emitter configured to emit IR light towards an inner surface of the lens; and
  - an IR light detector configured to measure an intensity of IR light reflected by the obscurants;
- a controller coupled to the IR light emitter-detector module, the controller configured to:
  - control the IR light emitter-detector module;
  - determine a level of light obstruction based on the measured intensity of reflected IR light; and
  - when the level of light obstruction meets predefined criteria, issue a warning;
- a pulse generator coupled to the controller and configured generate a pulse sequence; and
- a vehicle body control unit coupled to the pulse generator via a vehicle cable harness,
- wherein the vehicle body control unit is configured to monitor the pulse sequence.

11. The system of claim 10, wherein the pulse generator modifies the pulse sequence when the controller issues the warning.

12. The system of claim 11, further comprising:
- a vehicle fault indicator coupled to the vehicle body control unit, wherein the vehicle fault indicator is configured to alert an operator of the vehicle when the vehicle body control unit monitors the modified pulse sequence.

13. The system of claim 12 wherein the alert comprises at least one of turning on a signal lamp on a dashboard of the vehicle and running an indicator lamp function at double frequency.

14. The system of claim 12, further comprising:
- an obscurant detection response system coupled to the pulse generator and the vehicle body control unit, wherein the obscurant detection response system is configured to clean the lens at a time after the operator of the vehicle has been alerted.

15. The system of claim 14, wherein the obscurant detection response system cleans the lens with a water jet.

16. The system of claim 14, wherein the obscurant detection response system cleans the lens with a wiper.

17. The system of claim 10, further comprising:
- a communication port coupled to the controller and the pulse generator, wherein the communication port is configured to provide an alternative communication path between the controller and the pulse generator.

18. The system of claim 1, wherein the IR light detector is coupled to an operational amplifier.

* * * * *